United States Patent
Bahe et al.

(10) Patent No.: US 12,219,970 B2
(45) Date of Patent: Feb. 11, 2025

(54) BAKING INGREDIENTS SUITABLE FOR FAT REPLACEMENT

(71) Applicant: General Mills, Inc., Minneapolis, MN (US)

(72) Inventors: Kristi L Bahe, Coon Rapids, MN (US); Steven J Cox, Long Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 831 days.

(21) Appl. No.: 17/049,616

(22) PCT Filed: Aug. 22, 2018

(86) PCT No.: PCT/US2018/047545
§ 371 (c)(1),
(2) Date: Oct. 22, 2020

(87) PCT Pub. No.: WO2020/040760
PCT Pub. Date: Feb. 27, 2020

(65) Prior Publication Data
US 2021/0244041 A1 Aug. 12, 2021

(51) Int. Cl.
*A23D 7/015* (2006.01)
*A21D 2/16* (2006.01)
(Continued)

(52) U.S. Cl.
CPC ............. *A23D 7/015* (2013.01); *A21D 2/165* (2013.01); *A21D 2/186* (2013.01); *A21D 2/261* (2013.01);
(Continued)

(58) Field of Classification Search
CPC ........ A23D 7/015; A23D 7/0053; A23D 7/04; A21D 2/165; A21D 2/186; A21D 2/261; A21D 8/02; A21D 13/16; A23P 30/10
See application file for complete search history.

(56) References Cited

U.S. PATENT DOCUMENTS 3,196,020 A 7/1965 Work
4,861,604 A 8/1989 Tang et al.
(Continued)

FOREIGN PATENT DOCUMENTS

AU 17775/88 1/1989
CA 2012373 9/1990
(Continued)

OTHER PUBLICATIONS

Zoulias et al., "*Effect of Fat Mimetics on Physical, Textural and Sensory Properties of Cookies*", International Journal of Food Properties, vol. 3, No. 3, pp. 385-397, 2000.

*Primary Examiner* — Katherine D Leblanc
(74) *Attorney, Agent, or Firm* — Jordan IP Law, LLC; Tina Yin Sowatzke, Esq.

(57) ABSTRACT

Baking ingredients that can be used as a fat replacement in dough compositions and baked goods are described. Baking ingredients include a thermo-reversible hydrocolloid and can be included in a dough composition or layered with a laminated dough. The baking ingredients lead to improved flavor, improved appearance, improved texture, and improved lubricity in reduced fat bakery products. Methods of making and using baking ingredients are also described.

20 Claims, 2 Drawing Sheets

Vegetable shortening flakes | Baking ingredient flakes | Baking ingredient cubes

(51) Int. Cl.
    *A21D 2/18*           (2006.01)
    *A21D 2/26*           (2006.01)
    *A21D 8/02*           (2006.01)
    *A21D 13/16*          (2017.01)
    *A23D 7/005*          (2006.01)
    *A23D 7/04*           (2006.01)
    *A23P 30/10*          (2016.01)

(52) U.S. Cl.
    CPC ............... *A21D 8/02* (2013.01); *A21D 13/16* (2017.01); *A23D 7/0053* (2013.01); *A23D 7/04* (2013.01); *A23P 30/10* (2016.08)

(56) References Cited

U.S. PATENT DOCUMENTS

| | | |
|---|---|---|
| 5,093,144 A | 3/1992 | Ebskamp |
| 5,194,282 A | 3/1993 | Grossman et al. |
| 5,254,351 A | 10/1993 | De Boer et al. |
| 5,447,738 A | 9/1995 | De Bruijne et al. |
| 5,458,903 A | 10/1995 | Colson et al. |
| 5,508,056 A | 4/1996 | Norton et al. |
| 5,589,215 A | 12/1996 | Tang |
| 5,916,608 A | 6/1999 | Lanting et al. |
| 6,048,564 A | 4/2000 | Young et al. |
| 6,187,368 B1 | 2/2001 | Gibson et al. |
| 9,040,110 B2 | 5/2015 | Erickson et al. |
| 9,220,281 B2 | 12/2015 | Plank et al. |
| 9,795,151 B2 | 10/2017 | Staeger et al. |
| 2013/0052300 A1 | 2/2013 | Dendooven et al. |
| 2013/0052323 A1 | 2/2013 | Norton et al. |

FOREIGN PATENT DOCUMENTS

| | | | |
|---|---|---|---|
| CA | 2196767 | 10/1994 | |
| DE | 10060707 | 8/2002 | |
| EP | 468552 | 1/1992 | |
| EP | 2460416 | 6/2012 | |
| FR | 258047 | 10/1986 | |
| GB | 2205849 | 12/1988 | |
| JP | 5284943 | 11/1993 | |
| JP | 3056187 | 6/2000 | |
| JP | 2007124910 | 5/2007 | |
| JP | 4530968 | 8/2010 | |
| JP | 2012147691 | 8/2012 | |
| WO | WO 1991/019424 | 12/1991 | |
| WO | WO 1993/017565 | 9/1993 | |
| WO | WO 1995/035036 | 12/1995 | |
| WO | WO 1996/011587 | 4/1996 | |
| WO | WO 1997/025869 | 7/1997 | |
| WO | WO 1998/047390 | 10/1998 | |
| WO | WO-2009064572 A1 * | 5/2009 | ........... A21D 10/005 |
| WO | WO 2014/020734 | 2/2014 | |

* cited by examiner

Baking ingredient cubes

Baking ingredient flakes

Vegetable shortening flakes

BAKING INGREDIENTS SUITABLE FOR FAT REPLACEMENT

CROSS-REFERENCE TO RELATED APPLICATIONS

This application represents a National stage application of PCT/US2018/047545, entitled "Baking Ingredients Suitable for Fat Replacement", filed Aug. 22, 2018, pending. The entire content of this application is incorporated by reference.

BACKGROUND OF THE INVENTION

Dough compositions suitable for use in bakery products such as biscuits and the like commonly include fat, water, flour, and a leavening agent (e.g., yeast) as the main ingredients. The fats that are typically used in these products are triglyceride-based fats that commonly contain a fairly high level of saturated fats and trans fatty acids. With the present trend towards healthier bakery products, there is a great demand for products that contain reduced fat or healthier fats (i.e., having a reduced amount of saturated fats and trans fatty acids). However, these fats provide mouthfeel, flavor, and body in bakery products such that altering the amount or type of fat generally equates to sacrificing taste and baking performance of the dough.

In general, fats are used to impart properties such as flakiness, tenderness or fluffiness to baked goods. Fat or shortening pieces (particles, chips, flakes, etc.) are often used because they take the form of solid particles that can be conveniently handled, stored, and processed. The use of fat or shortening pieces has both advantages and disadvantages. For example, the presence of fat improves organoleptic qualities of a dough or baked goods such as taste, body, mouthfeel and lubricity. However, high fat consumption may be undesirable due to health concerns. Thus, it is desirable to reduce the amount of fat in bakery products.

Attempts to reduce the amount of fat in a fat piece or chip have included hydrated fat pieces as disclosed in U.S. patent application Ser. No. 12/481,146 which is incorporated herein by reference. The hydrated fat pieces include water droplets dispersed throughout a solid fat phase, which reduces the total amount of fat present in the hydrated fat piece as compared to non-hydrated fat pieces. However, the overall amount of fat in the disclosed fat chips is still quite high. In addition, other prior art attempts to reduce fat in biscuits and laminated doughs have typically resulted in a finished product having a dry, floury texture and visible white spots on the surface. Reducing shortening chips in biscuit products leads to tough texture, reduced lubricity, starch spots on the surface of the product, and a lack of a fried flavor.

In addition, dough products are often distributed in frozen form, and then baked prior to consumption. These products are referred to as "freezer-to-oven" dough products, which describes a product that has been frozen prior to baking, and can be baked directly from the frozen state, without the need for thawing or proofing prior to baking. When FTO dough products are frozen for an extended time period before being baked, the properties of the fat used is critical to the finished product characteristics. Accordingly, there is a need for a reduced fat shortening that can be used with refrigerated or frozen dough without sacrificing the rich, fried flavor and golden appearance of full fat dough products.

SUMMARY

Described herein are baking ingredient pieces that can be used in place of some or all fat in a dough or dough-based good.

In some embodiments a baking ingredient piece is provided, where the baking ingredient piece has a melting point between 0° C. and 37° C. (e.g., between about 20° C. and about 37° C.), and includes 2% to 15% by weight gelatin or low methoxyl pectin, 5% to 60% by weight fat, and 40% to 93% by weight water. In some embodiments, a baking ingredient piece can include gelatin in an amount of from about 3% to about 10% by weight. In some embodiments, a baking ingredient piece can include starch in an amount of up to about 10%. In some embodiments, a baking ingredient piece can include a flavorant. In some embodiments, a baking ingredient piece can be frozen.

Also provided herein is a dough that includes a plurality of baking ingredient pieces as described herein. In some embodiments, a dough can also include solid shortening pieces or an oil. In some embodiments, where a dough includes baking ingredient pieces and solid shortening pieces, the baking ingredient pieces and solid shortening pieces can be included in a ratio of 25:75 to 75:25. In some embodiments, a dough provided herein can be packaged.

Also provided herein is a dough that includes a plurality of baking ingredient pieces, the baking ingredient pieces having a melting point between 0° C. and 37° C., and a gelatin or low methoxyl gelatin concentration of from 2% to 15% by weight. In some embodiments, a dough can include a plurality of shortening pieces or an oil. In some embodiments, a dough can include baking ingredient pieces that contain no fat. In some embodiments, a dough can include baking ingredient pieces that contain fat in an amount up to 50% by weight. In some embodiments, a dough can include baking ingredient piece that contain gelatin or low methoxyl pectin in an amount of from about 3% to about 10% by weight. In some embodiments, a dough can contain baking ingredient pieces that include starch in an amount of up to about 10% by weight. In some embodiments, a dough can include baking ingredient pieces that have a melting point between 20° C. and 37° C. In some embodiments a dough can include baking ingredient pieces and solid shortening pieces are included in a ratio of 25:75 to 75:25 or a ratio of 40:60 to 60:40.

Provided herein is a laminating ingredient, that includes 2% to 15% by weight gelatin or low methoxyl pectin, 5% to 60% by weight fat, and 40% to 93% by weight water. In some embodiments, a laminating ingredient can have a melting point between about 0° C. and about 37° C. or between about 20° C. and about 37° C. In some embodiments, a laminating ingredient can include starch in an amount of up to about 10%. In some embodiments, a laminating ingredient can contain 20% to 50% by weight fat.

Also provided herein is a dough containing a laminating ingredient described herein. In some embodiments, a dough containing a laminating ingredient can include solid shortening pieces or an oil. In some embodiments, a dough containing a laminating ingredient can be packaged.

Also provided herein is a cooked dough-based good made from any dough described herein.

Provided herein is a method of making a baking ingredient, the method including combining gelatin or low methoxyl pectin, fat, and water to produce a liquid mixture having 2% to 15% by weight gelatin or low methoxyl pectin, 5% to 60% by weight fat, and 40% to 93% by weight water; and allowing the liquid mixture to set to produce the baking ingredient, the baking ingredient being a solid or semi-solid composition. In some embodiments, a method of making a baking ingredient can include a step of heating the liquid mixture to a temperature sufficient to ensure gelling of the gelatin or low methoxyl pectin. In some embodiments, a step of allowing the liquid mixture to set can include cooling the liquid mixture (e.g., to a temperature of 10° C. or less, 4° C. or less, or 0° C. or less). In some embodiments, a method of making a baking ingredient can include a step of forming pieces from the solid or semi-solid composition to produce the baking ingredient. In some embodiments, a forming step can be performed by breaking the solid or semi-solid composition into baking ingredient pieces. In some embodiments, a forming step can be performed by depositing the liquid mixture into molds and allowing the liquid mixture to set to form baking ingredient pieces.

Provided herein is method of making a laminating ingredient, the method including combining gelatin or low methoxyl pectin, fat, and water to produce a liquid mixture having 2% to 15% by weight gelatin or low methoxyl pectin, 5% to 60% by weight fat, and 40% to 93% by weight water; and allowing the liquid mixture to set to produce the laminating ingredient, the laminating ingredient being a semi-solid composition. In some embodiments, a method of making a laminating ingredient can include a step of heating the liquid mixture to a temperature sufficient to ensure gelling of the gelatin or low methoxyl pectin. In some embodiments a step of allowing the liquid mixture to set can include cooling the liquid mixture. In some embodiments, at least a portion of a cooling can be performed in a scraped surface heat exchanger. In some embodiments, a method of making a laminating ingredient can include a step of depositing the semi-solid composition on a dough.

Provided herein is a method of making a dough that includes combining a flour, water, and a baking ingredient, the baking ingredient comprising 2% to 15% by weight gelatin or low methoxyl pectin to make the dough. In some embodiments of a method of making a dough, the baking ingredient can include 5% to 20% by weight fat and 40% to 93% by weight water. In some embodiments of a method of making a dough, the baking ingredient can include starch in an amount of up to about 10%. In some embodiments of a method of making a dough, the baking ingredient can be in the form of discrete pieces. In some embodiments of a method of making a dough, the dough can include a plurality of solid shortening pieces or an oil.

Also provided herein is method of making a laminated dough, the method including depositing a layer of a baking ingredient comprising 2% to 15% by weight gelatin or low methoxyl pectin onto a dough layer, and repeatedly folding and compressing the dough layer and the baking ingredient layer to form a laminated dough comprising alternating layers of dough and baking ingredient. In some embodiments of a method of making a laminated dough, the baking ingredient can include 5% to 20% by weight fat and 40% to 93% by weight water. In some embodiments of a method of making a laminated dough, the baking ingredient can include starch in an amount of up to about 10%. In some embodiments of a method of making a laminated dough, the dough can include a plurality of solid shortening pieces or an oil.

Additional objects, features and advantages of the invention will become more readily apparent from the following detailed description when taken in conjunction with the drawings wherein like reference numerals refer to corresponding parts in the several views.

DETAILED DESCRIPTION

Figure 1:
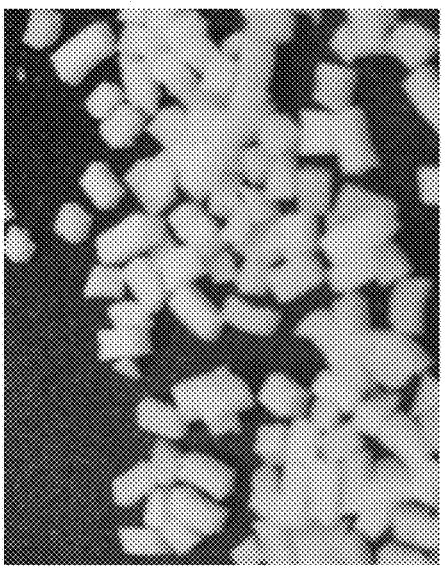
FIG. 1 is a picture of vegetable shortening flakes typically used in commercial doughs (left), a baking ingredient flaked on a roller (center), and a baking ingredient cubed into pieces approximately 0.13 inches cubed (right).
Figure 1:
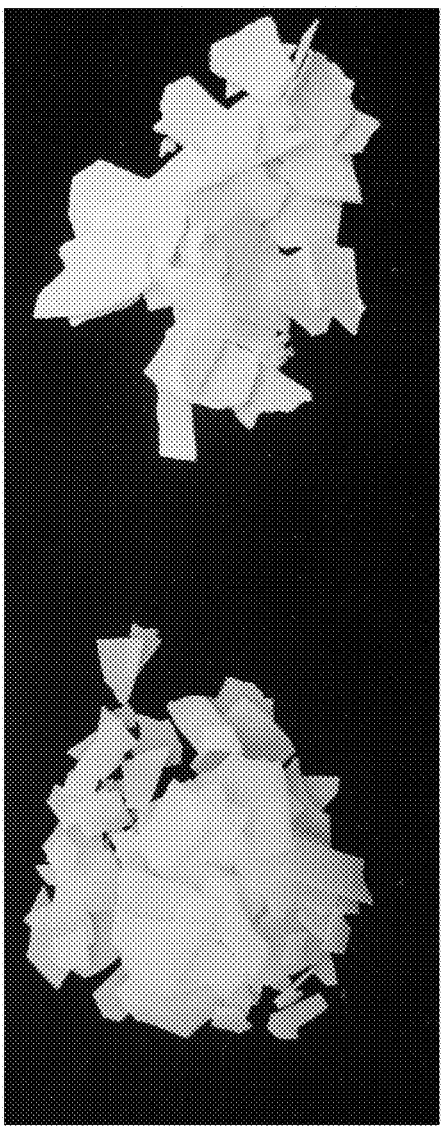

Fat in dough products provides a number of benefits to the cooked product, including a pleasing texture and flavor, and prevent perceived dryness. In addition, fat can contribute to browning of the surface a cooked dough product to provide a desired appearance. However, consumers are increasingly looking for ways to enjoy their favorite foods with fewer calories, including calories contributed by fat. Previous attempts at reducing fat content in baked goods, especially in dough products that are meant to be cooked after refrigerated or frozen storage, resulted in moderate reductions or a loss in desired organoleptic qualities.

It was discovered, and is described herein, that a thermo-reversible hydrocolloid could be used to replace a portion of the fat in a dough product without losing the benefits of a full fat product. In fact, in some cases, use of a thermo-reversible hydrocolloid could reduce a "greasy" flavor in a baked good made by replacing some of the fat content with the thermo-reversible hydrocolloid.

The invention relates generally to baking ingredients formulated to reduce fat content in a dough product, methods of preparing baking ingredients, and to dough compositions and baked articles made using the baking ingredients of the invention. The embodiments of the invention described herein are not intended to be exhaustive or to limit the invention to the precise forms disclosed in the following detailed description. Rather, the embodiments are chosen and described so that others skilled in the art can appreciate and understand the principles and practices of the invention.

Formulation

Provided herein is a baking ingredient formulated to reduce fat content in a dough product. A baking ingredient provided herein can be used as a replacement for a portion, or all of, a traditional fat ingredient in a dough to provide a baked good that is comparable to a full fat version, but having less fat (e.g., 25% less, 30% less, 40% less, 50% less, or greater than 50% less). Traditional fat ingredients that can be replaced using a baking ingredient provided herein can include, without limitation, shortening chips in biscuit dough, laminating fat in pastries, shortening or liquid fats in other doughs, hydrated fat pieces in biscuit dough, and the like. Generally, a baking ingredient provided herein is a solid or semi-solid at temperatures suitable for dough storage (e.g., less than 10° C., less than 4° C., or 0° C. or less), and melt during cooking to contribute to mouthfeel, flavor, and body of the finished baked good in the absence of part or all of the fat that would otherwise have been included. For example, a baking ingredient provided herein can have a melting point of from about 0° C. to about 37° C., preferably from about 25° C. to about 37° C. As used herein, the melting point of a baking ingredient can be measured as Mettler Dropping Point (American Oil Chemist's Society Standard Procedure, 7$^{th}$ Edition (2017), Method Cc 18-80).

A baking ingredient provided herein includes a thermo-reversible hydrocolloid. In some embodiments, a baking ingredient is a composition that includes a thermo-reversible hydrocolloid and a fat. As used herein, the term "thermo-reversible hydrocolloid" refers to a hydrocolloid that forms a gel that can be turned to liquid form, i.e., melted, upon sufficient heating. In some cases, a thermo-reversible hydrocolloid can be returned to gel form after melting. A thermo-reversible hydrocolloid suitable for use in a baking ingredient provided herein has a melting point between 0° C. and 37° C. (e.g., between about 10° C. and about 37° C.) as measured using Mettler Dropping Point. Examples of suitable thermo-reversible hydrocolloids include gelatin (e.g., beef-based gelatin, pork-based gelatin, fish-based gelatin, and the like) and pectin, particularly low methoxyl pectin (LM pectin) and amidated low methoxyl pectin, or combinations thereof. In some embodiments, a combination of low methoxyl pectin and high methoxyl pectin (HM pectin) can be used.

A thermo-reversible hydrocolloid is included in a baking ingredient provided herein in an amount of from 1.5% to 15% (e.g., about 2% to about 15%, about 5% to about 14%, or about 6% to about 12%) by weight of the baking ingredient. In some embodiments, a gelatin is included in a baking ingredient in an amount of about 5% to about 8% (e.g., about 6% to about 7%) by weight of the baking ingredient. In some embodiments, a pectin (e.g., LM pectin or a combination of LM pectin and HM pectin) is included in a baking ingredient in an amount of about 1.5% to about 5% (e.g., about 2% to about 3%).

A fat can be included in a baking ingredient in an amount of up to 60% (e.g., from 5% to 40%, or from 7% to 15%) by weight of the baking ingredient, although, in some embodiments, a baking ingredient need not contain any fat. Suitable fats include any edible fat or oil, such as soybean oil, canola oil, coconut oil, shortenings, butter, palm oil, lard, or the like, and combinations thereof. The amount and type of oil can be adjusted to achieve the desired fat content and/or physical properties of the baking ingredient. For example, a liquid oil may be included at lower level relative to the amount of thermo-reversible hydrocolloid than a solid fat to ensure that the baking ingredient solidifies sufficiently to form a solid that can be formed into pieces. Although higher levels of fat can be included in a baking ingredient that can be formed into pieces resembling shortening chips, fat content in such a baking ingredient is preferred to be up to about 20% (e.g., up to about 15%, or up to about 12%). In another example, a solid fat or liquid oil can be included at a level closer to 10% to 50% (e.g., about 25% to about 45%) by weight of the baking ingredient to produce a baking ingredient that functions well as a replacement for a laminating fat.

In some embodiments, a fat can be included that imparts a flavor to a baking ingredient provided herein. For example, coconut oil, bacon fat, butter, or chicken fat can be used to impart flavor to a baking ingredient.

In some embodiments, a baking ingredient provided herein can include a long-chained carbohydrate in an amount of up to 10% (e.g., from 2% to 10%, or 2.5% to 8.5%) by weight of the baking ingredient. Suitable long chained carbohydrates include starch (e.g., pregelatinized starch), fiber, maltodextrin, and the like, or combinations thereof. A long-chained carbohydrate can aid in manufacturing a baking ingredient provided herein by acting as an emulsifier prior to gelation of thermo-reversible hydrocolloid in the baking ingredient. In addition, a long-chained carbohydrate can increase viscosity of a baking ingredient, which can improve gelation time for manufacturing. Increased viscosity of a baking ingredient can also reduce spreading of the baking ingredient during cooking of a dough in order to more closely mimic the behavior of a standard fat during cooking.

In some embodiments, particularly when pectin is used, a source of calcium can also be included in a baking ingredient. Suitable sources of calcium include, for example, calcium in a water portion of the baking ingredient, tricalcium citrate and/or tricalcium dicitrate, monocalcium phosphate (MCP), and the like. Combinations of calcium sources may also be used.

In some embodiments, a baking ingredient provided herein can include a flavorant (e.g., vanilla or other extracts, savory flavorants, butter flavor, and the like). It was surprisingly found that a flavorant included in a baking ingredient provided herein can improve perception of the flavorant in a baked good compared to the flavorant being included in the dough separately from the baking ingredient. Thus, a baking ingredient provided herein can be used to improve a flavor of a baked good and/or reduce the amount of flavorant required to achieve the same perceived intensity.

In some embodiments, one or more additional ingredients can be included in a baking ingredient provided herein. Examples include emulsifiers, colorants, water activity modifiers (e.g., salt or sugar), and the like.

Water is included in a baking ingredient in an amount of 40% to 98% (e.g., from about 40% to about 93%) by weight of the baking ingredient. The amount of water included in a baking ingredient is sufficient to ensure the gelation of the thermo-reversible hydrocolloid, as well as to provide the balance of the baking ingredient content. That is, for example, in a baking ingredient that includes 6% thermo-reversible hydrocolloid, 10% fat, 5% starch, and 2% other ingredients (e.g., flavorant, colorant, water activity modifier, or the like), water can be included in an amount of 77% by weight of the baking ingredient to achieve 100% of the baking ingredient content.

In some embodiments, a baking ingredient contains a thermo-reversible hydrocolloid and water, but contains no measurable amount of fat. In such embodiments, a baking ingredient can contain any or all of the other ingredients that can be included in a baking ingredient that does contain fat, and such ingredients can be included at similar levels in a baking ingredient that does not contain fat as a baking ingredient that does contain fat. Embodiments of a baking ingredient that does not contain fat are generally used in conjunction with a fat ingredient separately added to a dough. For example, baking ingredient pieces containing no fat can be used to replace a portion (e.g., up to 75%, or 25% to 60%, or about 50%) of shortening chips that are used in a biscuit dough.

Methods of Manufacture

A baking ingredient provided herein can be prepared by combining ingredients to be included in the baking ingredient to produce a liquid mixture and allowing the liquid mixture to set to produce a solid or semi-solid composition. A liquid mixture can be made by combining ingredients at a temperature at or above a temperature, or heating the combined ingredients to a temperature, where each of the ingredients is a liquid or can form a suspension or emulsion. For example, a gelatin, a liquid oil, and water can be combined at a temperature above 0° C. to produce a liquid mixture. In another example, a liquid mixture containing a fat that is solid at room temperature, gelatin, and water can be made at a temperature at or above the melting point of the fat.

A liquid mixture can be made using any appropriate method or equipment. For example, a liquid mixture can be formed in a mixer (e.g., a high shear mixer) or homogenizer. Preferably, a liquid mixture is homogeneous, with ingredients dissolved, in suspension, or in an emulsion in water.

In some embodiments, a liquid mixture can be heated to a temperature sufficient to ensure that the included thermo-reversible hydrocolloid will form a gel upon cooling. For example, if the liquid mixture contains gelatin, the liquid mixture can be heated to a temperature above the melting point of the gelatin (e.g., about 25° C. to about 40° C.) prior to setting.

A liquid mixture can be allowed to set to produce a solid or semi-solid composition to produce a baking ingredient provided herein. In some embodiments, a liquid mixture can be allowed to set by cooling the liquid mixture, e.g., to a temperature of less than 25° C. (e.g., 10° C. or less, 4° C. or less, or 0° C. or less).

A baking ingredient provided herein can be in a form resembling commonly used shortening ingredients. For example, in some embodiments, a baking ingredient can be formed, cut, or broken into pieces to resemble shortening chips used in doughs or batters, such as biscuit dough. In another embodiment, a semi-solid baking ingredient can be used as a laminating ingredient, similar to a laminating fat.

A baking ingredient that is formed into pieces can have any desired shape, for example, chips, flakes, rods, spheres, and other geometries. Any desired method can be used for forming a baking ingredient into pieces. For example, in some embodiments, a baking ingredient can be formed into pieces using a flaking apparatus. Such an apparatus is described in U.S. Pat. No. 9,040,110, which is incorporated herein by reference. For example, a liquid mixture can be applied to a flaking roll that is at a temperature at or below the temperature where the liquid mixture solidifies (e.g., a temperature below 25° C., 10° C. or less, 4° C. or less, or 0° C. or less). A scraping blade can be used to scrape the solidified baking ingredient from the flaking roll, and to cause fracturing of the solidified baking ingredient into flakes.

In other examples, a baking ingredient can be formed into pieces in molds, or broken or cut from larger portions. For example, a baking ingredient can be cooled to form a block and then cut into pieces (e.g., cubes) using a blade or wire, using equipment such as that used to cut cheese.

Pieces suitable for use can be any size appropriate for incorporating into a dough. For example, cubed pieces can range in size from about 0.1 inch to about 0.3 inch on each side, with a size about 0.1 to 0.15 being more preferred. In some embodiments, such pieces can resemble fat pieces typically used in doughs in size and/or shape. See, FIG. 1.

At temperatures below the melting point of the baking ingredient pieces (e.g., less than 25° C., 10° C. or less, 4° C. or less, or 0° C. or less), the individual pieces making up the fat piece composition do not adhere to one another to any appreciable degree. This allows the fat piece composition to be handled, dispensed, and applied to a dough composition as individual pieces, rather than as a solid mass.

In some embodiments, a baking ingredient can be formed as larger portions, such as blocks, or stored in large containers, such as in tubs. Such larger portions can be reformed and/or melted, as desired for handling or use. For example, a baking ingredient formulated as a laminating ingredient may be stored in tubs, then passed through an extruder without melting for application to a dough. In another example, blocks of a baking ingredient can be melted and reformed as smaller pieces in, e.g., a mold, or broken or cut up into smaller pieces without melting.

In some embodiments, a liquid mixture is allowed to set while being cooled in a scraped surface heat exchanger to form a baking ingredient. Examples of scraped surface heat exchangers include Kombinator scraped surface heat exchangers (SPX FLOW, Inc., Charlotte, North Carolina, USA) and Votator® scraped surface heat exchangers (SPX FLOW, Inc.). In some embodiments, a baking ingredient can be directly applied from a scraped surface heat exchanger to a dough to function as a laminating ingredient. In some embodiments, a baking ingredient can be formed into pieces or stored after passing through a scraped surface heat exchanger.

Methods of Using

A baking ingredient provided herein can be used as a replacement for a portion, or all of, a traditional fat ingredient in a dough to provide a baked good that is comparable to a full fat version, but having less fat (e.g., 25% less, 30% less, 40% less, 50% less, or greater than 50% less). A baking ingredient provided herein can be used to prepare various fresh, refrigerated, or frozen dough compositions and dough articles. For instance, a baking ingredient can be used in a food product such as a raw dough composition that is stored at refrigerated or freezing temperatures. A baking ingredient can be combined with other dough ingredients and mixed to become suspended in a bulk dough that results from mixing the other dough ingredients. A "bulk dough" (or "dough matrix") refers to dough ingredients other than the baking ingredient. In some embodiments, a bulk dough contains dough ingredients such as water, flour (e.g., wheat flour, oat flour, quinoa flour, barley flour amaranth flour, or the like, or combinations thereof), and a leavening agent (e.g., chemical leavening agent, yeast, or a combination of these), and optionally, one or more of a sweetener (e.g., lactose, sucrose, fructose, dextrose, maltose, sugar alcohols, high fructose corn syrup, malt, hydrolyzed corn syrup, and the like, or mixtures thereof), milk-based ingredient (e.g., whole milk, skim milk, milk powder, and the like), egg based ingredient (e.g., whole egg, egg white, and the like), flavorants (e.g., salts, extracts, spices, or natural or artificial flavors), additional fat or oil (e.g., milk-based oils or fats, plant-based oils or shortenings, fish-based oils, lards, margarine, or any combination thereof), particulates (e.g., raisins, currants, fruit pieces, nuts, seeds, vegetable pieces, and the like), and other ingredients (e.g., dough conditioners, processing aids, emulsifiers, and the like). Any additional fat that is present in the dough composition that is part of the bulk dough and not contained in the baking ingredient is referred to as "dough fat." A "dough composition," as described herein, refers to all dough ingredients including the baking ingredient and the ingredients of the bulk dough.

A baking ingredient provided herein can be used in a dough or batter in a manner similar to traditional shortening ingredients used in doughs and batters, such as shortening pieces and laminating fat. For example, solid or semi-solid baking ingredient pieces can be used to replace all or part of shortening pieces traditionally used in a dough or batter, and can be incorporated into the dough or batter in a manner similar to shortening pieces.

A baking ingredient provided herein can be used in any dough, such as refrigerated or frozen dough. In some embodiments, baking ingredient provided can be used in "freezer-to-oven" products (FTO). FTO products are products that have been formed into pieces (e.g., biscuits or loaves) then frozen as a raw or parbaked dough, and are then baked directly from the frozen state without needing to be thawed or proofed prior to eating. A baking ingredient can be useful in any FTO dough composition or dough product, including dough compositions sometimes referred to as "non-laminated" doughs, which means raw dough compositions that contain a bulk dough and that contain fat particles distributed (either homogeneously or non-homogeneously) within the bulk dough composition, and that do not contain multiple alternating layers of dough and fat, as would a laminated dough made by multiple steps of folding and sheeting the dough composition and a fat. An example of the use of fat or shortening pieces is with non-laminated bakery products is disclosed in U.S. Pat. No. 5,458,903 to Colson et al. which is incorporated herein by reference. Colson et al. teaches the use of fat or shortening pieces distributed through a dough in the form of chips, noodles, or pellets to provide a heterogeneous mixture of dough and fat until baked.

A baking ingredient provided herein can also be used as a laminating ingredient in laminated dough products, which are prepared from dough comprising a plurality of thin dough layers that are separated from one another by layers of a laminating ingredient, such as those described in U.S. patent application Ser. No. 14/327,986, "Hydrated Fat Compositions and Dough Articles" which is incorporated herein by reference. When laminated dough is baked, the individual layers of dough separate from one another due to the presence of the laminating ingredient layers to provide a plurality of thin baked dough layers. This layered structure is associated with a very desirable light, delicate, and flaky texture. Well known examples of laminated dough products include biscuits, crescents, croissants, puff pastry, Danish, cinnamon rolls, turnovers, rolls, strudel, breadsticks, and corn sticks.

A dough composition provided herein can be a developed dough composition or an under-developed dough composition. Representative dough compositions include biscuits, pizza crusts, pie crusts (e.g., pot pie crusts), cinnamon rolls, other sweet rolls, and various bread doughs. In some embodiments, a dough composition can include fat in the form of a baking ingredient described herein, and optionally some amount of additional fat ("dough fat") in the form of solid shortening pieces, plastic fat, liquid fat (oil), or a combination of these different types of dough fat. The amount of fat present in a dough composition as part of a baking ingredient, relative to the total amount of fat in the dough composition (total fat is the amount of fat contained in the shortening composition, plus the fat of any plastic, liquid oil, or other fat that is part of the bulk dough (i.e., the "dough fat")), can vary. The amount of fat included in a dough as a part of a baking ingredient can range from 0% (e.g., in the case of a baking ingredient containing no fat) to about 100% (e.g., in the case where the only fat source in a dough is a baking ingredient), or from 0% to about 60%, or from 0% to about 15% of the total fat in the dough composition. In some embodiments, baking ingredient pieces and solid shortening pieces can be included in a dough composition at a ratio of from about 25:75 to about 75:25 (e.g., 30:70 to 70:30, or about 50:50).

A dough composition provided herein can be packaged in any suitable packaging, such as a pouch, can, or the like, and stored at refrigerated or frozen temperature.

In some embodiments, a baking ingredient can be used in a dough to make a cooked dough-based food. Such a cooked dough-based good can be made by combining a baking ingredient with other dough ingredients as described above to produce a bulk dough. The bulk dough is then formed and cooked (e.g., fried or baked) to form a cooked dough-based food. A cooked dough-based food can be packaged, e.g., individually or in packages of multiple items. A cooked dough-based food can be maintained at room temperature, or can be refrigerated or frozen. A refrigerated or frozen cooked dough-based food can be allowed to warm to ambient temperature, or can be heated (e.g., in a microwave or oven) prior to consumption.

EXAMPLES

Example 1—Baking Ingredient Pieces

Baking ingredients were made including thermo-reversible hydrocolloid, a fat, a long chain carbohydrate, and any other ingredients as described in Table 1, with the balance being water. Briefly, the thermoreversible hydrocolloid and long chain carbohydrate were dry blended, then the dry blend and fat were added to water, which was then heated to 185° F. with agitation to blend the ingredients and form an emulsion. The liquid mixture was then solidified and formed using various methods, including piping onto a sheet and cooling to room temperature or freezing to make half spheres, dropping into liquid nitrogen to make spheres, cooling on a drum and fracturing to make irregular flakes, and cooling in blocks and cut into cubes.

TABLE 1

| Sample | Thermo-reversible hydrocolloid (% by weight) | Fat (% by weight) | Long chain carbohydrate (% by weight) | Other ingredient (% by weight) |
|---|---|---|---|---|
| 1 | Piscine gelatin (3.35%) | Vegetable shortening (10%) | Starch (8.35%) | |
| 2 | Porcine gelatin (3.35%) | Bacon fat (10%) | Starch (8.35%) | |
| 3 | Porcine gelatin (3.35%) | Butter (10%) | Starch (8.35%) | |
| 4 | Porcine gelatin (3.35%) | Vegetable shortening (10%) | Starch (8.35%) | Buttermilk (10%) |
| 5 | Porcine gelatin (6.7%) | Vegetable shortening (10%) | Starch (8.35%) | |
| 6 | Porcine gelatin (3.35%) | Vegetable shortening (10%) | Maltodextrin (10%) Starch (8.35%) | |
| 7 | HM Pectin (1.33%) LM Pectin (0.67%) | Vegetable shortening (10%) | Starch (8.35%) | Tricalcium dicitrate (0.03%) |
| 8 | LM Pectin (3%) | Vegetable shortening (10%) | Starch (8.35%) | Monocalcium phosphate (0.03%) |
| 9 | Porcine Gelatin (6.7%) | Coconut shortening 76° F. melt point (10%) | Starch (8.35%) | |
| 10 | Porcine Gelatin (6.7%) | Soybean oil (10%) | Starch (8.35%) | |
| 11 | Porcine Gelatin (10.1%) | Vegetable shortening (10%) | Starch (8.35%) | |
| 12 | Porcine Gelatin (6.7%) | Vegetable shortening (10%) | Starch (8.35%) | Bacon flavor (0.5%) |

TABLE 1-continued

| Sample | Thermo-reversible hydrocolloid (% by weight) | Fat (% by weight) | Long chain carbohydrate (% by weight) | Other ingredient (% by weight) |
|---|---|---|---|---|
| 13 | Porcine Gelatin (6.7%) | Vegetable shortening (10%) | Starch (8.35%) | Lemon flavor (0.5%) |
| 14 | Porcine gelatin (3.35%) | Vegetable shortening (10%) | Starch (8.35%) | Glycerin (5%) |
| 15 | Porcine gelatin (3.35%) | Vegetable shortening (10%) | Starch (8.35%) | Glycerin (10%) |
| 16 | Porcine gelatin (3.35%) | Vegetable shortening (10%) | Starch (5.57%) | |
| 17 | Porcine gelatin (6.7%) | Vegetable shortening (10%) | None | |
| 18 | Cold soluble porcine gelatin (6.7%) | Vegetable shortening (10%) | Pregelatinized starch (8.35%) | |
| 19 | Porcine gelatin (3.35%) | Vegetable shortening (10%) | Starch (8.35%) | |
| 20 | Bovine gelatin (3.35%) | Vegetable shortening (10%) | Starch (8.35%) | |

Each of the baking ingredients described in Table 1 produced solid or semi-solid pieces that could be incorporated into a biscuit dough similarly to shortening particles. The pieces were included in a biscuit dough as a replacement for approximately 50-60% of the fat chips normally used in the biscuit dough, resulting in at least a 45% fat reduction relative to control. The dough was baked and sampled to determine the functionality of the baking ingredients. In each case, the resulting biscuits had an eating experience similar to control biscuits containing the normal fat chip content. In some cases, in biscuits that included baking ingredient pieces at (e.g., samples 12 and 13 in Table 1), the flavor and/or mouthfeel was sometimes perceived as superior to the full-fat version.

Figure 2:
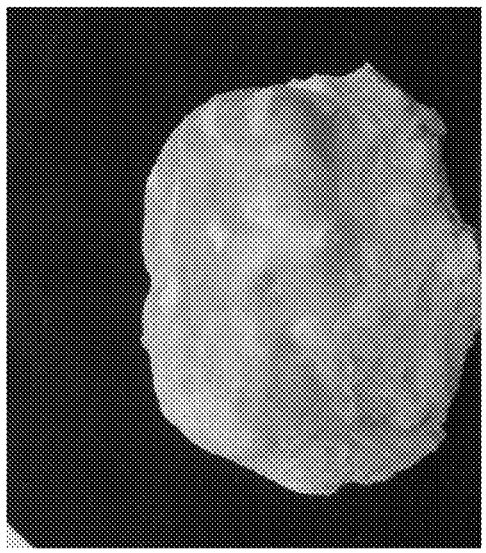
FIG. 2 is a picture of a control biscuit made using vegetable shortening chips (left), a biscuit made with only 40% of the vegetable shortening chips of the control biscuit and no replacement (center), and a biscuit made with only 40% of the vegetable shortening chips of the control biscuit, with the removed chips replaced with a baking ingredient.
Figure 2:
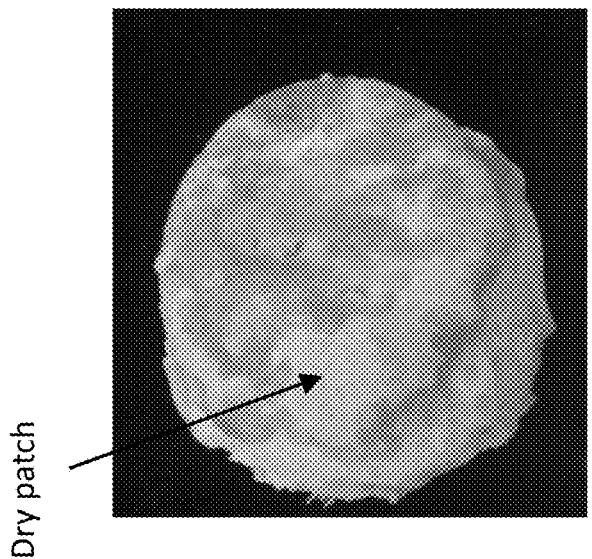
Figure 2:
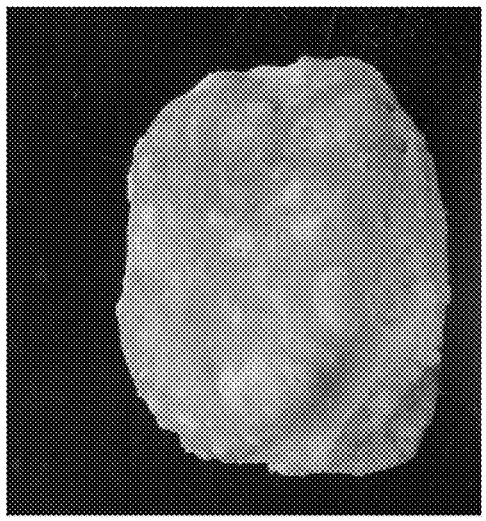

As seen in FIG. 2, when compared to a control biscuit with a typical fat content provided by vegetable shortening chips, a biscuit made with 60% fewer vegetable shortening chips results in dry patches on the biscuit surface (center), while replacing the removed vegetable shortening chips with a baking ingredient (Sample 19 in Table 1) restored the desired visual appearance of the biscuit relative to control. The eating experience of the biscuit with 60% fewer vegetable shortening chips was tougher and chewier relative to the control, while the biscuit that had the removed vegetable shortening chips was nearly indistinguishable from the control biscuit.

Samples with higher gelatin content (e.g., Sample 11) resulted in a biscuit that was somewhat springier than control. Samples 12 and 13, which contained a flavorant, provided a more intense flavor in the final baked biscuit than if the same amount of flavorant was incorporated directly into the bulk dough, or if the flavorant was incorporated into shortening pieces. In addition, Samples 2 and 3 introduced bacon and butter flavors, respectively, to the baked product. Samples 14 and 15 had a lower water activity.

Example 2—Laminating Ingredient

Laminating ingredients were made including thermo-reversible hydrocolloid, a fat, a long chain carbohydrate, and any other ingredients as described in Table 2, with the balance being water. The ingredients were combined and subjected to scraped surface heat exchange and pin working in a Votator.

TABLE 2

| Sample | Thermo-reversible hydrocolloid | Fat (% by weight) | Long chain carbohydrate (% by weight) |
|---|---|---|---|
| 1 | Porcine gelatin (3.35%) | Vegetable shortening (10%) | Starch (4.18%) |
| 2 | Porcine gelatin (3.35%) | Vegetable shortening (10%) | Starch (6.26%) |
| 3 | Porcine gelatin (2.22%) | Vegetable shortening (40%) | Starch (5.57%) |

Each of the baking ingredients described in Table 2 produced a semi-solid composition that could be applied to a dough and folded into layers similar to a laminating fat.

Example 3—Baking Ingredient Containing No Fat

Baking ingredients were made including thermo-reversible hydrocolloid, a long chain carbohydrate, and any other ingredients as described in Table 3, with the balance being water. Briefly, the thermoreversible hydrocolloid and long chain carbohydrate were dry blended, then added to water, which was then heated to 185° F. with agitation to blend the ingredients and form an emulsion. The liquid mixture was then solidified and formed by piping onto a sheet and freezing to make half spheres. The pieces were then coated in vegetable shortening to reduce stickiness.

TABLE 3

| Sample | Thermo-reversible hydrocolloid | Long chain carbohydrate (% by weight) |
|---|---|---|
| 1 | Porcine gelatin (3.35%) | Starch (3.35%) |
| 2 | Porcine gelatin (6.7%) | Starch (6.7%) |
| 3 | Porcine gelatin (3.35%) | Starch (6.7%) |

Each of the baking ingredients described in Table 3 produced solid or semi-solid pieces that could be incorporated into a biscuit dough similarly to shortening particles. After freezing then baking, the biscuits were slightly wet and gummy after 24 hours from freezing. However, after a week from freezing, the biscuits were similar to control full fat biscuits.

Other embodiments of this invention will be apparent to those skilled in the art upon consideration of this specification or from practice of the invention disclosed herein.

Various omissions, modifications, and changes to the principles and embodiments described herein may be made by one skilled in the art without departing from the true scope and spirit of the invention which is indicated by the following claims.

What is claimed is:

1. A baking ingredient piece, the baking ingredient piece having a melting point between 0° C. and 37° C., and comprising:
   a. 2% to 15% by weight gelatin or low methoxyl pectin;
   b. 5% to 60% by weight fat; and
   c. 40% to 93% by weight water,
   wherein the baking ingredient piece is configured to be a fat replacement in a dough product.

2. The baking ingredient piece of claim 1, wherein the baking ingredient piece includes gelatin in an amount of from about 3% to about 10% by weight.

3. The baking ingredient piece of claim 1, further comprising starch in an amount of up to about 10%.

4. The baking ingredient piece of claim 1, wherein the baking ingredient piece has a melting point between 20° C. and 37° C.

5. The baking ingredient piece of claim 1, further comprising a flavorant selected from the group consisting of bacon, lemon, vanilla and butter flavorants.

6. The baking ingredient piece of claim 1, wherein the baking ingredient piece is frozen.

7. A dough, comprising a plurality of baking ingredient pieces as claimed in claim 1, with each of the baking ingredient pieces being a fat replacement in the dough.

8. The dough of claim 7, further comprising solid shortening pieces or an oil.

9. The dough of claim 8, wherein the baking ingredient pieces and solid shortening pieces are included in a ratio of 25:75 to 75:25.

10. The dough of claim 7, wherein the dough is packaged.

11. A cooked dough-based good, made from a dough as claimed in claim 7.

12. A method of making a baking ingredient piece having a melting point between 0° C. and 37° C., the method comprising:
   a. combining gelatin or low methoxyl pectin, fat, and water to produce a liquid mixture having:
      i. 2% to 15% by weight gelatin or low methoxyl pectin;
      ii. 5% to 60% by weight fat; and
      iii. 40% to 93% by weight water;
   b. allowing the liquid mixture to set to produce a solid or semi-solid composition,
   wherein the baking ingredient piece is configured to be a fat replacement in a dough product.

13. The method of claim 12, further comprising a step of heating the liquid mixture to a temperature sufficient to ensure gelling of the gelatin or low methoxyl pectin.

14. The method of claim 12, wherein the step of allowing the liquid mixture to set comprises cooling the liquid mixture and wherein the temperature is reduced to 10° C. or less.

15. The method of claim 12, further comprising a step of forming pieces from the solid or semi-solid composition to produce the baking ingredient piece.

16. The method of claim 15, wherein the forming step is performed by breaking the solid or semi-solid composition into baking ingredient pieces, or wherein the forming step is performed by depositing the liquid mixture into molds and allowing the liquid mixture to set to form baking ingredient pieces.

17. The dough of claim 7, wherein the dough is a laminating dough having alternating layers of the dough and the baking ingredient.

18. The cooked dough-baked good of claim 11, wherein the cooked dough-based good is a laminated dough good comprising alternating layers of the dough and the baking ingredient.

19. The cooked dough-baked good of claim 18, wherein the alternating layers of the laminated dough good constitute folded and compressed alternating layers of the dough and the baking ingredient.

20. The baking ingredient piece of claim 1, wherein the baking ingredient piece consists essentially of:
   a. 2% to 15% by weight gelatin or low methoxyl pectin;
   b. 5% to 60% by weight fat;
   c. 40% to 93% by weight water; and
   d. up to 10% by weight long-chained carbohydrate.

* * * * *